(12) United States Patent
Klein

(10) Patent No.: US 11,615,639 B1
(45) Date of Patent: Mar. 28, 2023

(54) PALM VEIN IDENTIFICATION APPARATUS AND METHOD OF USE

(71) Applicant: Jackson Klein, Arlington, TX (US)

(72) Inventor: Jackson Klein, Arlington, TX (US)

( * ) Notice: Subject to any disclaimer, the term of this patent is extended or adjusted under 35 U.S.C. 154(b) by 241 days.

(21) Appl. No.: 17/160,130

(22) Filed: Jan. 27, 2021

(51) Int. Cl.
*G06V 40/12* (2022.01)
*H04N 5/232* (2006.01)
*G06V 40/145* (2022.01)

(52) U.S. Cl.
CPC .......... *G06V 40/12* (2022.01); *G06V 40/145* (2022.01); *H04N 5/23296* (2013.01)

(58) Field of Classification Search
CPC ... G06V 40/12; G06V 40/145; H04N 5/23296
See application file for complete search history.

(56) References Cited

U.S. PATENT DOCUMENTS

| | | | | |
|---|---|---|---|---|
| 6,989,745 B1 * | 1/2006 | Milinusic | ......... | G08B 13/19691 340/517 |
| RE48,527 E * | 4/2021 | Reeve | .................. | G05D 1/0246 |
| 11,151,234 B2 * | 10/2021 | Kontsevich | ............ | G06V 20/20 |
| 2013/0243264 A1 * | 9/2013 | Aoki | ....................... | G06V 40/12 382/115 |
| 2013/0342715 A1 * | 12/2013 | Nakayama | ......... | H04N 5/23287 348/208.11 |
| 2015/0269406 A1 * | 9/2015 | Hama | .................. | G06V 10/242 382/124 |
| 2016/0034747 A1 * | 2/2016 | Jo | ......................... | G06F 3/0304 382/118 |
| 2017/0027511 A1 * | 2/2017 | Connor | ................ | A61B 5/0537 |
| 2020/0042683 A1 * | 2/2020 | Lee | ......................... | G06V 10/17 |
| 2020/0346753 A1 * | 11/2020 | Qian | ...................... | B64C 39/024 |
| 2021/0081646 A1 * | 3/2021 | Setlak | .................... | G06V 10/17 |

* cited by examiner

*Primary Examiner* — John B Strege
(74) *Attorney, Agent, or Firm* — Leavitt Eldredge Law Firm

(57) ABSTRACT

A palm vein identification apparatus includes a base to support a first sensor; the first sensor mounted on the base via a multi-axis gimbal, the multi-axis gimbal to provide movement of the sensor such that the sensor can capture one or more images from a plurality of angles; a position control in communication with the first sensor and to correct movement of the first sensor; and a secondary sensor mounted on the base, the secondary sensor to capture an environment around the palm vein identification apparatus to detect a palm; the first sensor is positioned based on information collected from the secondary sensor.

12 Claims, 4 Drawing Sheets under consideration. It is to be understood that various omissions and substitutions of equivalents are contemplated as circumstances may suggest or render expedient, but such are intended to cover the application or implementation without departing from the spirit or scope of the claims of the present application.

PALM VEIN IDENTIFICATION APPARATUS AND METHOD OF USE

BACKGROUND

1. Field of the Invention

The present invention relates generally to systems and methods that utilize palm vein identification, and more specifically, to a palm vein identification apparatus that is configured to allow for a user to scan from a variety of angles, thereby allowing for improved ease of use.

2. Description of Related Art

Palm vein identification is a technology that is currently developing in the art. Palm vein recognition is a biometric technology that is configured to authenticate a person on a basis of vein pattern recognition, as each person has a unique vein pattern associated with their hands. In FIG. 1, a flowchart 101 of a conventional method is shown. General systems utilize a scanning device, wherein an image of the person's veins is captured and analyzed to create a record, as shown with boxes 103, 105. On a subsequent use, the person will re-scan their hand, wherein the image is then transmitted into data that can be compared to a database to determine authentication of the person, as shown with boxes 107, 109.

Typical palm scanners illuminates and scan the person's palm using near-infrared light, which is absorbed by deoxygenated blood flowing through the person's veins. The light is reflected back, causing the veins to appear black, thereby allowing for a quality image to be captured by the camera of the scanner.

It should be appreciated that there are many benefits to the use of palm vein identification systems. Namely, it should be appreciated that palm vein patterns differ markedly from one individual to another. In addition, the scans rely on blood flowing through the person, which ensures a living individual is recognized. Yet further, conventional scanners do not require contact by the user, thereby making them hygienic and suitable for high volume use.

However, despite the advantages, there is room for improvement in the field of palm vein identification. Specifically, conventional systems require the user's palm to be presented in a nearly perfect and flat orientation at a narrow range of distance from the sensor and in a narrow range of orientations to the sensor. This can become tedious and inconvenient for the user and may result in in accurate scans.

It is an object of the present invention to provide a system that has a palm vein identification apparatus that is configured to provide the ability to scan the user's hand at a variety of angles and distances, thereby improving efficiency and accuracy.

Accordingly, although great strides have been made in the area of palm vein identification systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
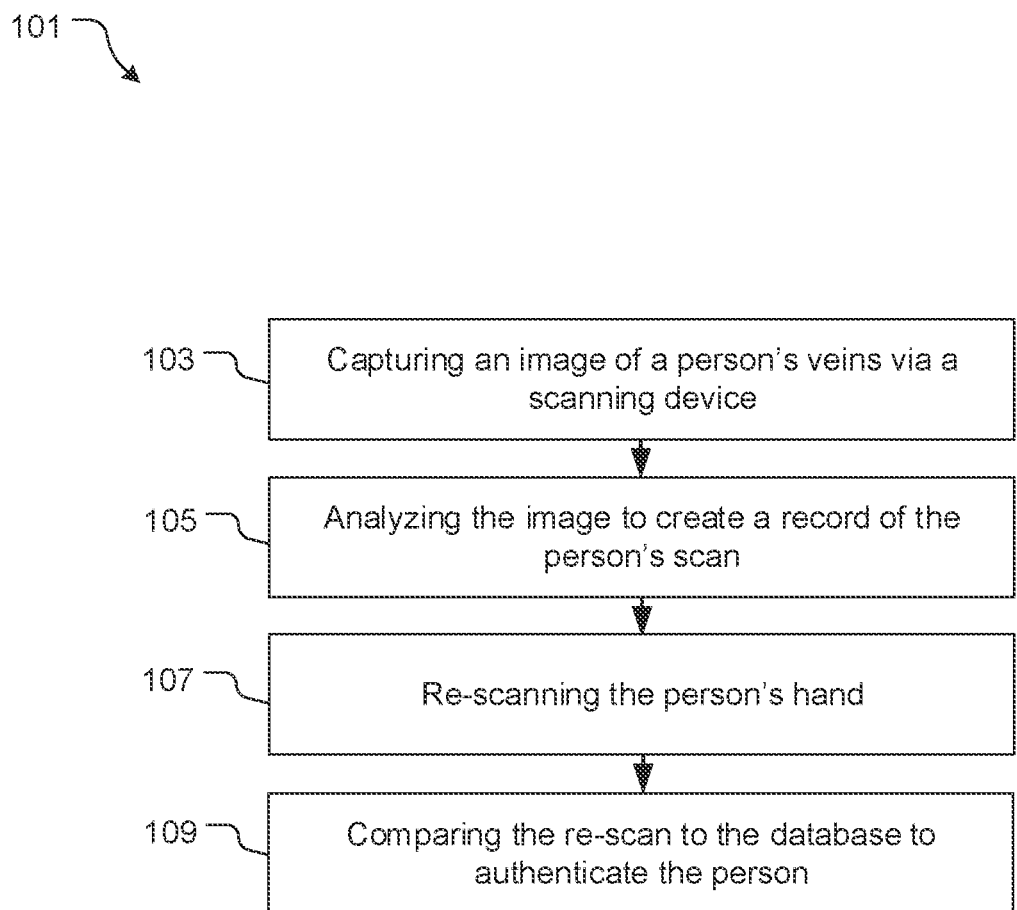
FIG. 1 is a flowchart of a method conventional of palm vein identification.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional palm vein identification systems. Specifically, the present invention provides for an apparatus that is configured to provide palm scanning from a variety of angles, thereby aiding in efficiency and ease of use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
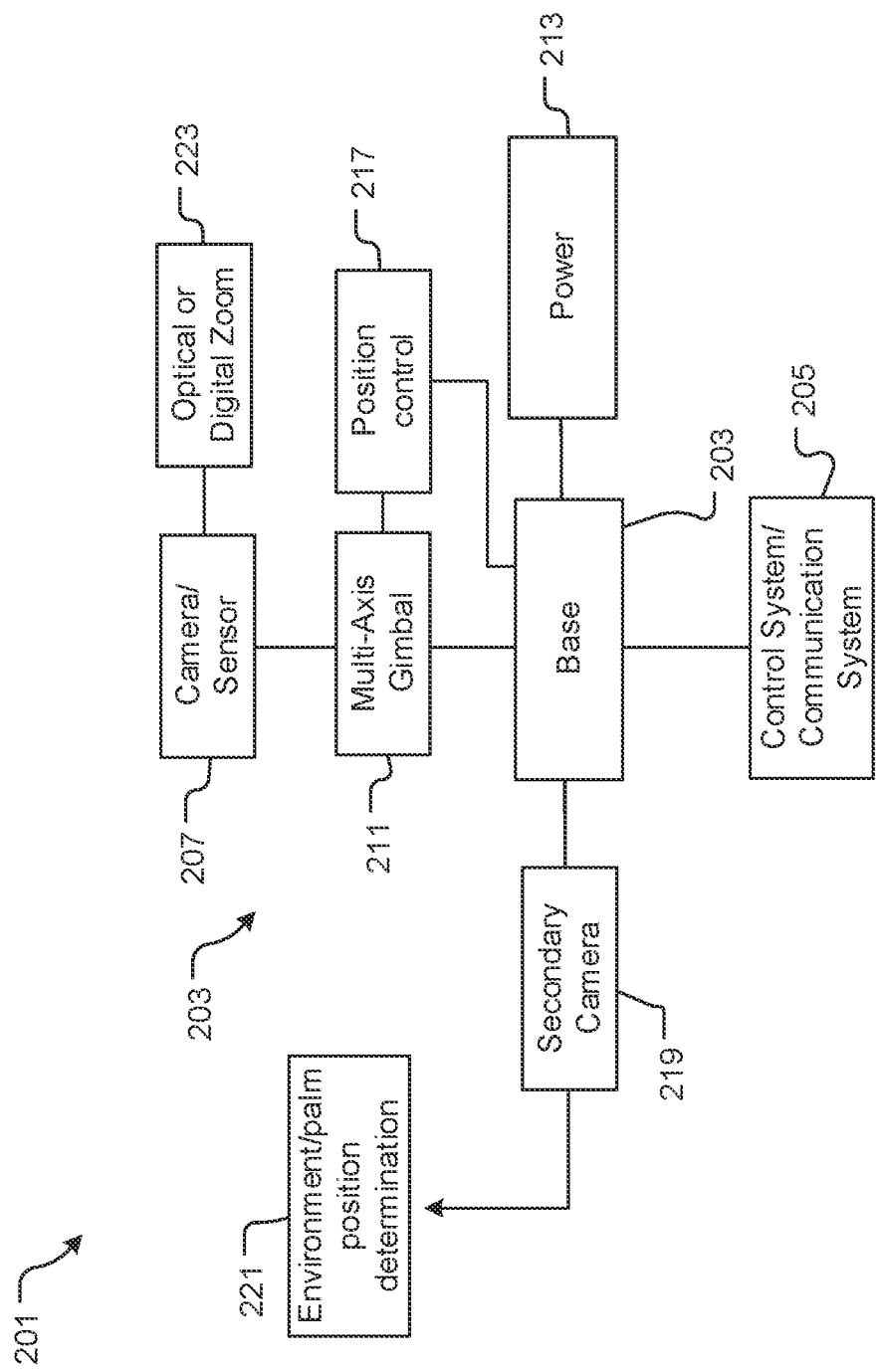
FIG. 2 is a schematic of a palm vein identification apparatus in accordance with a preferred embodiment of the present application.

Referring now to the drawings wherein like reference characters identify corresponding or similar elements throughout the several views, FIG. 2 depicts a schematic of a palm vein identification system 201 in accordance with a preferred embodiment of the present application. It will be appreciated that system 201 overcomes one or more of the above-listed problems commonly associated with conventional palm vein identification systems.

In the contemplated embodiment, system 201 includes a palm vein scanning apparatus 203, the palm vein scanning device 203 having a control/communication system 205 configured to provide electronic communication and data collection as needed.

One of the unique features believed characteristic of the present application is the incorporation of a first sensor 207, which can be a camera, the first sensor 207 being attached to a base 209 via a multi-axis gimbal 211. It should be appreciated that the base can vary in shape, size, and the like as needed based on aesthetical, functional, or manufacturing considerations. The base is merely a structural component to support the necessary hardware to create the functionality and further to connect to a power source 213 as needed.

In the preferred embodiment, the multi-axis gimbal 211 is further in communication with a position control 217, the position control being any component configured to correct movement of the sensor 207 as needed. In one embodiment, the position control 217 is a servomechanism, however, other components could be used.

System 201 further includes one or more secondary sensors 219, such as one or more cameras, which is configured to detect an environment and a palm 221, thereby providing information needed to determine a position needed by the first sensor 207. It should be appreciated that the one or more secondary sensors can be a series of sensors as functional considerations require.

During operation, the system is configured such that as a palm approaches, the one or more secondary sensors 221 will determine the location and the presence of the palm within the environment. This data is then fed into the control system 205 and the position control 217, wherein the first sensor 207 is then manipulated via the multi-axis gimbal 211 as necessary to scan the palm. The sensor 207 can utilize an optical or digital zoom lens 223 during the capturing of images or can further utilize other technology known or developed in the future to ensure quality image capturing and to allow for a wider acceptable range of distances between the sensor and the user's hand.

Figure 3:
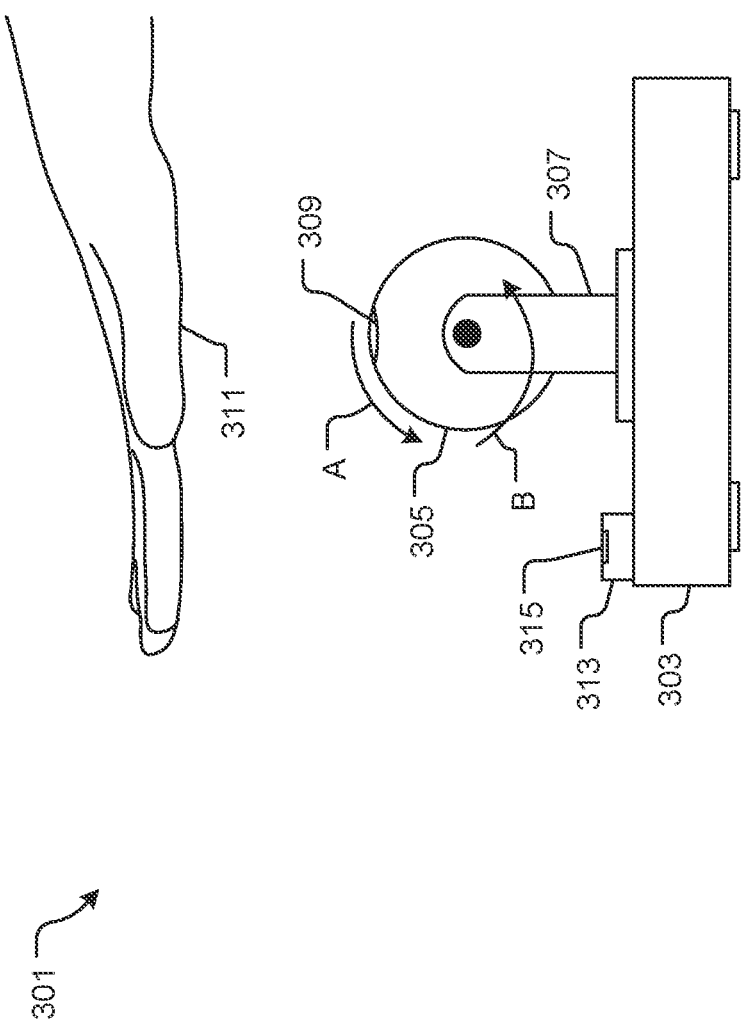
FIG. 3 is a simplified side view of an exemplary embodiment of the apparatus of FIG. 2.

It should be appreciated that the system allows for capturing of palm vein scans without the need for the user to be precise in their placement of their palm. For example, the user may approach the apparatus 203 from an angle as opposed to being straight on. This improves efficiency and accuracy of the system In FIG. 3, a simplified side view depicts an exemplary embodiment of a palm vein scanning apparatus 301 that utilizes the features discussed above. As shown, the apparatus 301 includes a structural base 303, the structural base supporting a first sensor 305 via a multi-axis gimbal 307. The first sensor 305 configured to move, as shown with arrows A and B, thereby repositioning the lens 309 as needed to capture a scan of a palm 311. Although not shown in FIG. 3, the apparatus will include a position control to ensure correct operation of the camera. The apparatus 301 further includes a secondary sensor 313 that can be mounted on the base, wherein the secondary sensor includes a lens 315 to detect the palm 311 within the environment. It should again be appreciated that the location, structural features, and arrangement can vary, while still providing the same functionality.

Figure 4:
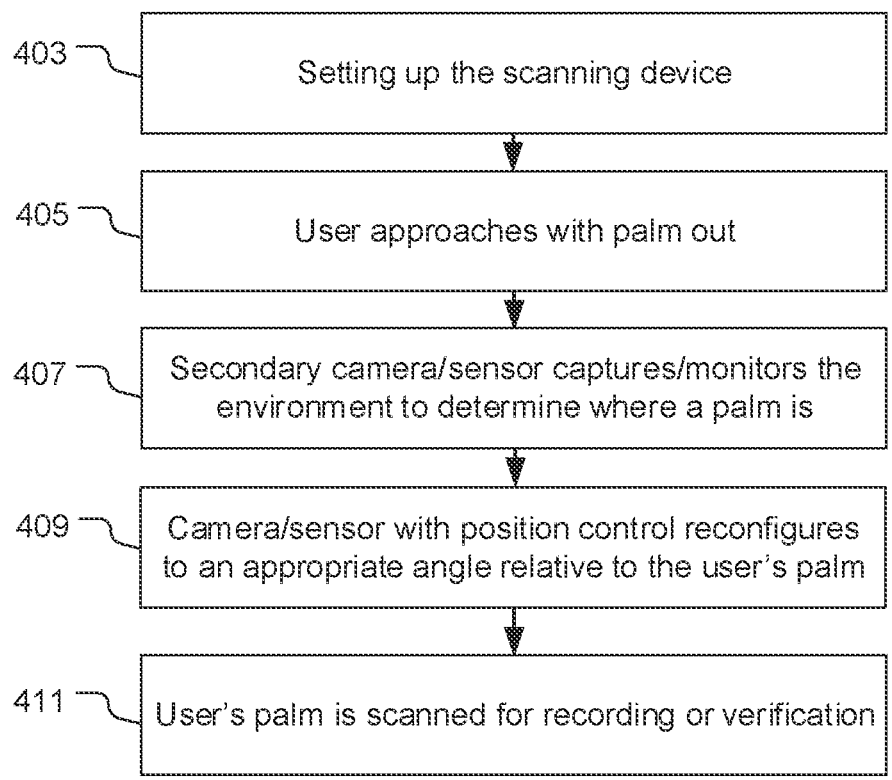
FIG. 4 is a flowchart of a method of use of the system of FIG. 2.

In FIG. 4, a flowchart 401 depicts the method of use of system 201. During use, the scanning device is set up, the scanning device having the features discussed above, as shown with box 403. The user will then approach the device with their palm out, although they can approach at various angles, as shown with box 405. The secondary sensor will detect the presence of a palm within the environment, thereby providing the information necessary for the first sensor to be activated, as shown with box 407. The first sensor, along with the position control, will reconfigure to an appropriate angle relative to the user's palm, as shown with box 409. The apparatus will then proceed to scan the user's palm for palm vein identification and verification, as shown with box 411.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A palm vein identification apparatus, comprising:
   a base configured to support a first sensor;
   the first sensor mounted on the base via a multi-axis gimbal, the multi-axis gimbal configured to provide movement of the sensor such that the sensor can capture one or more images from a plurality of angles;
   a position control in communication with the first sensor and configured to correct movement of the first sensor; and
   one or more secondary sensors mounted on the base, the one or more secondary sensors configured to capture an environment around the palm vein identification apparatus to detect a palm;
   wherein the first sensor is positioned based on information collected from the one or more secondary sensors.

2. The apparatus of claim 1, further comprising:
   an optical zoom lens incorporated into the first sensor.

3. The apparatus of claim 1, further comprising:
   a digital lens incorporated into the first sensor.

4. The apparatus of claim 1, wherein the position control is a servomechanism.

5. The apparatus of claim 1, further comprising:
   a control system configured to receive images captured from the first sensor for communication.

6. The apparatus of claim 1, wherein the first sensor is a camera.

7. A method of palm vein identification, the method comprising:
   providing a palm vein identification apparatus having a base supporting a first sensor, the first sensor mounted on the base via a multi-axis gimbal and in communication with a position control;
   detecting, via a secondary sensor mounted on the base, an environment and a presence of a palm;

manipulating, via the multi-axis gimbal and based on information received from the secondary sensor, the first sensor such that the first sensor can capture one or more images of the palm;

capturing the one or more images of the palm via the first sensor.

8. The method of claim 7, further comprising:

zooming into the palm via an optical zoom lens incorporated into the first sensor.

9. The method of claim 7, wherein the first sensor is a camera.

10. The method of claim 7, wherein the position control is a servomechanism.

11. The method of claim 7, further comprising:

verifying, via a control system, an authentication of the palm based on the one or more images.

12. The method of claim 7, further comprising:

zooming into the palm via a digital lens incorporated into the first sensor.

\* \* \* \* \*